Figure 1:
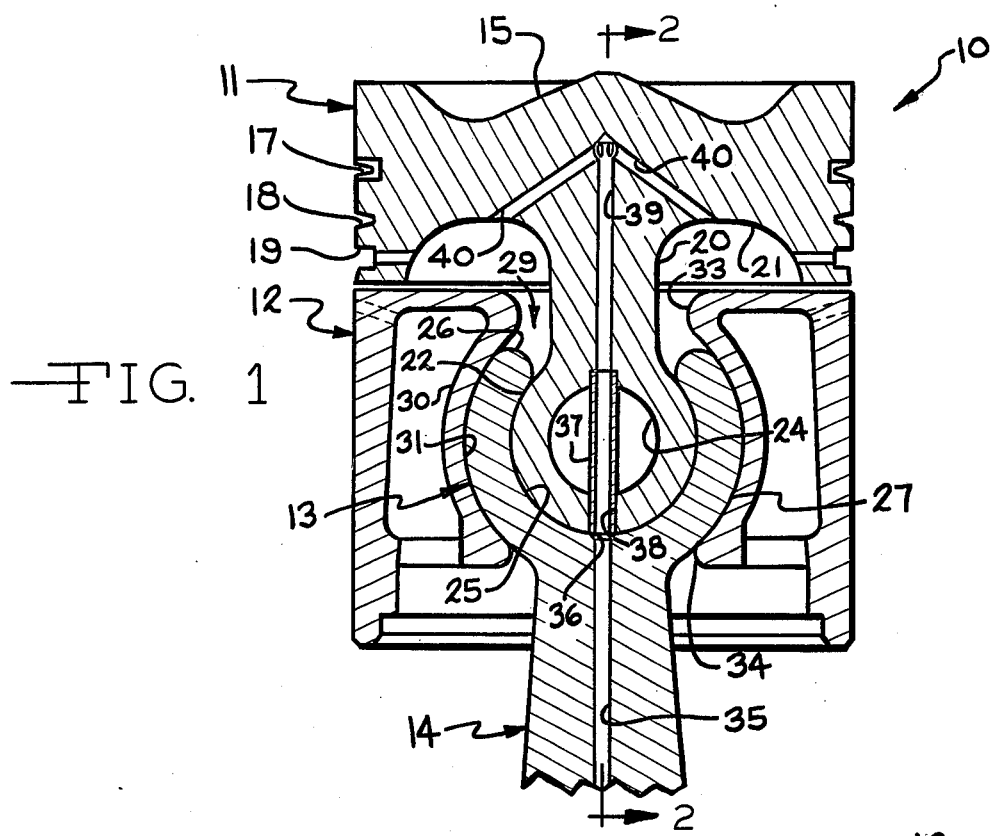

United States Patent [19]

Guenther

[11] 4,073,220
[45] Feb. 14, 1978

[54] PISTON ASSEMBLY

[75] Inventor: William D. Guenther, Hagerstown, Ind.

[73] Assignee: Dana Corporation, Toledo, Ohio

[21] Appl. No.: 754,096

[22] Filed: Dec. 27, 1976

Related U.S. Application Data

[63] Continuation-in-part of Ser. No. 577,562, May 14, 1975, Pat. No. 4,013,057.

[51] Int. Cl.$^2$ ............................. F16J 1/04; F16J 1/14
[52] U.S. Cl. ...................................... 92/190; 92/187; 92/219; 123/193 P
[58] Field of Search ................. 92/190, 189, 187, 219, 92/238, 216, 224; 123/193 P

[56] References Cited

U.S. PATENT DOCUMENTS

| | | | |
|---|---|---|---|
| 2,260,240 | 10/1941 | Taylor | 92/187 |
| 2,308,178 | 1/1943 | Kishline | 92/190 |
| 3,173,344 | 3/1965 | Mongitore | 92/187 |
| 3,695,150 | 10/1972 | Salzmann | 92/187 X |
| 3,906,924 | 9/1975 | Elsbett | 92/224 |

FOREIGN PATENT DOCUMENTS 442,006  1/1936  United Kingdom .................. 92/189

Primary Examiner—Irwin C. Cohen
Attorney, Agent, or Firm—Oliver E. Todd, Jr.; Robert E. Pollock

[57] ABSTRACT

An improved piston assembly for high-power internal combustion engines such as supercharged diesel engines. The piston includes separate head and skirt portions. An elongated bearing member having an external journal surface is formed across the bottom of the piston head. A wrist pin, which is attached to or integral with a connecting rod, defines a generally tubular shaped bearing member having an internal bearing surface in which the piston head bearing member is journaled to permit rotational movement between the connecting rod and the piston head. The external journal surface on the piston head is supported by the wrist pin along its entire length to prevent any flexing of the wrist pin when high compressive forces are applied to the piston head. The skirt is connected to the wrist pin by thrust bearings which engage an external journal surface on the wrist pin substantially along its entire length to permit rotational movement between the piston head and the piston skirt.

3 Claims, 2 Drawing Figures

U.S. Patent    Feb. 14, 1978    4,073,220

PISTON ASSEMBLY

This is a continuation-in-part of my copending application Ser. No. 577,562, filed May 14, 1975, now U.S. Pat. No. 4,013,057.

This invention relates to pistons for internal combustion engines and more particularly to an improved construction for a piston having separate head and skirt portions.

In some internal combustion engines, it is desirable to use pistons having a skirt portion which is separate from, and rotatable with respect to, a head portion. A connecting rod is attached in a conventional manner to a wrist pin within the piston. The piston head is then attached to the wrist pin on either side of the connecting rod to permit rotational movement between the connecting rod and the piston head. The ends of the wrist pin engage bushing or bearing surfaces on the skirt to also permit rotational movement between the skirt, the head and the connecting rod. A piston of this type has several advantages over a piston having integral head and skirt portions. Side thrust exerted by the connecting rod on the piston is applied only to the skirt. Elimination of side thrust on the piston head reduces rocking action of the head caused by such side thrust. This in turn reduces oil consumption and also reduces noise and wear on the piston and the cylinder walls. Since the piston head is separate from the skirt, heat is not transferred by conduction from the head to the skirt. Therefore, the separate skirt operates at a lower temperature than a skirt which is integral with a piston head. The lower skirt temperature permits closer tolerances between the piston skirt and the engine cylinder walls, which also reduces noise.

Pistons of the above-described construction having a separate head and skirt are sometimes used in high-power diesel engines. The output of a diesel engine can be greatly increased through the use of a supercharger. However, supercharged diesel engines stress conventional pistons to their design limit due to increased combustion pressure and a consequent heat build-up in the piston. Under these conditions, the wrist pin tends to deflect or bend. In extreme cases, deflection of the wrist pin will result in a cracked piston and particularly in a cracked piston skirt.

According to the present invention, an improved construction is provided for a piston having separate head and skirt portions. The improved construction eliminates flexing of the wrist pin under extreme load conditions and, therefore, eliminates a possible source of damage to the piston. A tubular shaped bearing member extends along most of the distance across the bottom of the piston head. The bearing member has a journal surface which engages the wrist pin. The connecting rod either is formed integral with or is bolted to the wrist pin. The wrist pin is generally tubular in shape and defines an external journal surface, an internal bearing surface and a top opening or slot extending in an axial direction along the entire length of the wrist pin. The journal surface on the piston head and the internal bearing surface on the wrist pin cooperate to permit rotational movement between the connecting rod and the piston head. The piston head journal surface engages the bearing surface on the wrist pin along its entire length to prevent flexing of the wrist pin when extreme loads are applied to the piston head. The piston skirt is attached to the piston head by means of an internal thrust bearing. The exterior surface of the wrist pin forms a journal surface which is engaged by the thrust bearing to permit rotational movement between the piston skirt and the piston head. The thrust bearing engages the sides of the bearing member substantially along its entire length to prevent any sideways flexing or bending of the wrist pin from connecting rod side thrust under heavy load conditions.

In the illustrated and preferred embodiment, the piston is oil cooled by pumping oil through passages in the connecting rod, the wrist pin and the piston head and then spraying the oil against the bottom of the piston head. In addition, the connecting rod will also conduct a greater amount of heat from the piston head than in prior art pistons because of the greatly increased contact area between the piston head and the wrist pin.

Accordingly, it is an object of the invention to provide an improved piston for internal combustion engines, compressors and the like.

Another object of the invention is to provide an improved construction for a piston having separate head and skirt sections.

Still another object of the invention is to eliminate wrist pin deflection in a piston having separate head and skirt sections.

Other objects and advantages of the invention will become apparent from the following detailed description, with reference being made to the accompanying drawings.

Figure 2:
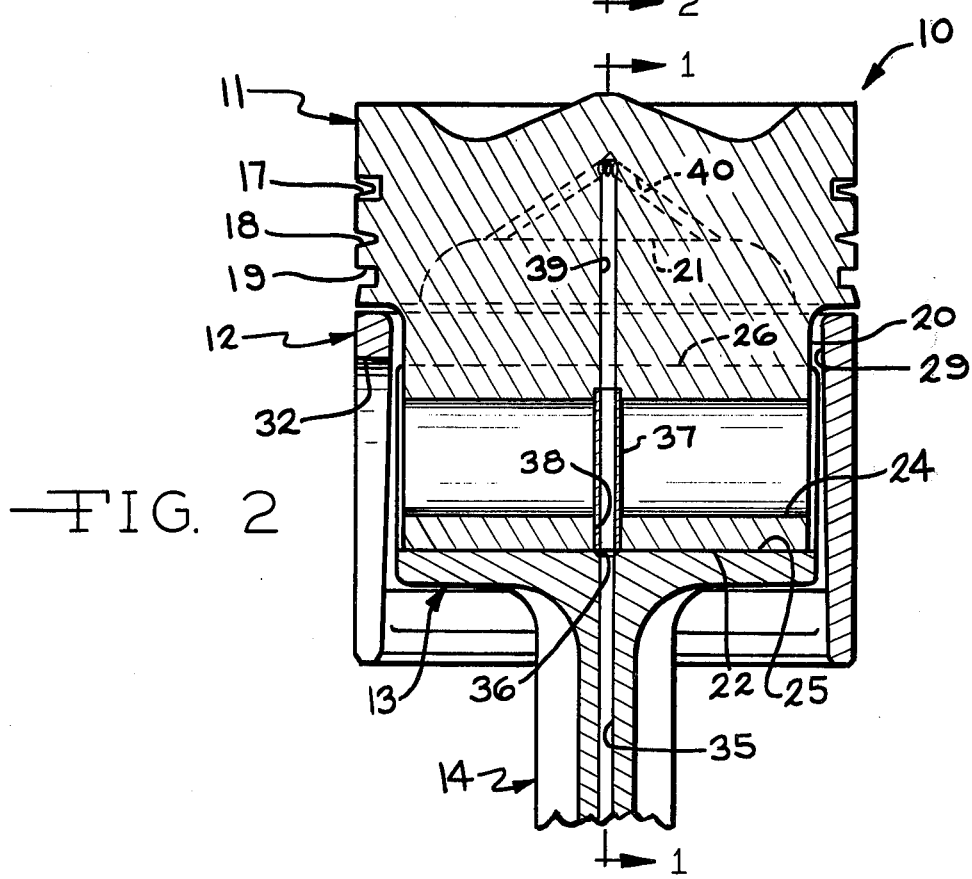

FIG. 1 is a fragmentary vertical cross sectional view taken through a piston, a wrist pin and a connecting rod constructed in accordance with a preferred embodiment of the invention; and FIG. 2 is a fragmentary vertical cross sectional view of the piston, the wrist pin and the connecting rod according to the preferred embodiment of the invention and rotated 90° from the cross sectional view of FIG. 1.

Turning now to the drawings and particularly to FIGS. 1 and 2, a piston assembly 10 is shown according to a preferred embodiment of the present invention. The piston assembly 10 generally includes a piston head 11, a separate piston skirt 12, a wrist pin 13 and a connecting rod 14 (shown in fragmentary). In the embodiment shown, the wrist pin 13 is formed integrally with the connecting rod 14. However, it should be noted that a separate wrist pin may be bolted or otherwise attached to the connecting rod. The piston head 11 and the piston skirt 12 are attached to the wrist pin 13 in a novel manner which permits rotational movement between the head 11 and the connecting rod 14 and also between the skirt 12 and the head 11. The piston head 11, the piston skirt 12 and the wrist pin 13 are interconnected in a manner to prevent any flexing of the wrist pin 13 under extreme load conditions, as when the piston assembly 10 is operated in a supercharged internal combustion diesel engine.

The piston head 11 is formed from a single casting of a suitable metal or metal alloy. Cast iron and high strength alloys are preferred. The piston head 11 has a crown 15 which is shaped to form one wall of an expansion chamber, such as a combustion chamber (not shown) in an internal combustion engine, to provide desired operating characteristics. Around a periphery 16 of the head 11, three circumferential grooves 17, 18 and 19 are provided for receiving conventional piston ring seals (not shown), with the two uppermost grooves 17 and 18 receiving compression rings and the lowermost groove 19 receiving an oil ring. Typically, the uppermost groove 17 is formed in an annular ring of high strength reinforcing material, such as Ni-resist alloy, incorporated in the heat 11 by any convenient technique. A web support structure 20 extends below the piston head 11 across the center of an inner piston crown 21. A bearing member 22 having a cylindrical exterior journal surface 23 is formed below the web support structure 20. Preferably, the bearing member 22 is hollow, having an interior opening 24, to reduce the weight of the piston head 11. As best seen in FIG. 2, the webbed support 20 and the bearing member 22 extend substantially across the width of the piston head 11, leaving room only to position over the bearing member 22 the piston skirt 12 which has the same exterior diameter as the piston head 11.

The wrist pin 13 is in the general form of a longitudinally slit tube, having a C-shaped cross section as shown in FIG. 1. The wrist pin 13 has an internal bearing surface 25 adapted to closely receive the journal surface 23 on the piston head bearing member 22. When the bearing member 22 is positioned within the wrist pin 13, the webbed support 20 on the piston head 11 extends through an upper opening 26 on the wrist pin 13. The upper opening 26 is directed away from the connecting rod 14. The upper opening 26 is somewhat wider than the webbed support 20 to permit limited rotational movement between the piston head 11 and the connecting rod 14. The wrist pin 13 also includes an external journal surface 27 which is concentric with the bearing surface 25.

The piston skirt 12 has a tubular shape, with an exterior surface 28 which is machined to closely engage the sidewalls of a cylinder within an internal combustion engine (not shown). The skirt 12 also has an open interior 29 adapted to receive the webbed support 20 and the bearing member 22 on the piston head 11 and the wrist pin 13 attached to the connecting rod 14. A web 30 is formed within the skirt interior 29 and is machined to define an interior thrust bearing surface 31 which extends across the piston skirt interior 29. As shown in FIG. 2, a side opening 32 is formed in the skirt 12 to permit insertion of the wrist pin 13 into the skirt 12 by sliding axially into the thrust bearing 31. The web 30 which defines the thrust bearing 31 terminates at upper and lower skirt openings 33 and 34, respectively. The upper skirt opening 33 is sufficiently wide to pass the piston head bearing member 22 during construction of the piston assembly 10. The lower opening 34 passes the connecting rod 14 and is sufficiently wide as to permit limited rotational movement between the piston skirt 12 and the connecting rod 14.

The piston head 11, the piston skirt 12 and the connected wrist pin 13 on the connecting rod 14 are readily assembled together. During assembly, the piston head 11 is initially positioned adjacent the skirt 12 with the bearing member 22 and the web support 20 extending through the opening 33 to a position wherein the bearing member 22 is concentric with the thrust bearing 31. The wrist pin 13 is then inserted into the skirt 12 by sliding axially through the side opening 32 in the skirt 12 such that the journal surface 27 on the wrist pin 13 engages the thrust bearing 31 on the skirt 12 and the bearing surface 25 on the wrist pin 13 engages the journal surface 23 on the piston head bearing member 22. At this point, the curved bearing surfaces 23, 25, 27 and 31 are concentric to permit limited rotational movement between the piston head 11, the piston skirt 12 and the connecting rod 14. The completed piston assembly 10 is then ready for receiving rings within the grooves 17, 18 and 19 and for installation in an internal combustion engine. When the assembly 10 is then installed in such an engine, the piston head 11 and the piston skirt 12 will be limited to move together in an axial direction within a cylinder. A lower end of the connecting rod 14 (not shown) will be connected through a suitable bearing to a crank shaft in the engine. This bearing confines the wrist pin 13 within the skirt 12 by restraining the connecting rod 14 and attached wrist pin 13 from sideways movement. As the crank shaft is rotated, side thrust is transmitted from the wrist pin 13 through the skirt 12 to the cylinder walls while axially directed thrust passes from the piston head 11 through the wrist pin 13 to the connecting rod 14.

The piston assembly 10 is lubricated and cooled in a conventional manner. Oil is supplied under pressure through the engine crank shaft to a passage 35 which extends up the connecting rod 14 and terminates in a circumferential groove at the bearing surface 25. An oil tube 37 is pressed into an opening 38 which extends through the hollow piston head bearing member 22. The oil tube 37 connects from the groove 36 to a radial passage 39 which extends upwardly through the web support 20 on the piston head 11. The passage 39 connects in turn with a plurality of radial passages 40 which discharge the cooling and lubricating oil into the inner piston crown 21. Oil discharge from the passages 40 cools the piston head 11 and lubricates the bearing surfaces between the piston head bearing member 22 and the wrist pin 13 and between the piston skirt thrust bearing 31 and the wrist pin 13. Excess oil flows from piston skirt 12 downwardly into an engine sump, in a conventional manner. From the oil sump, the engine pumps the oil through a cooler and back through the passages in the piston assembly 10 and to other areas to be lubricated within the engine. Cooling of the piston head 11 is also increased by the increased contact area between the bearing member 22 and the wrist pin 13 which facilitates thermal conduction from the piston head 11 to the cooler connecting rod 14.

Although a specific embodiment of the piston assembly 10 has been shown and described above, it will be appreciated that various modifications and changes may be made without departing from the spirit and the scope of the following claims. It should also be noted that the piston assembly 10 is adaptable equally for use in various types of internal combustion engines and for use in other reciprocating piston devices such as high pressure compressors.

The embodiments of the invention in which an exclusive property or privilege is claimed are defined as follows:

1. A piston assembly comprising, in combination, a connecting rod, an elongated tubular wrist pin attached at the lower center of an external surface to an end of said connecting rod, said external wrist pin surface defining an external journal surface, said wrist pin further having an internal bearing surface and a top opening extending along its length, a piston head having an upper surface for forming one wall of an expansion chamber and having a bearing member defining a journal surface extending substantially across a lower surface engaging said internal bearing surface of said wrist pin substantially along its entire length, said bearing member and said wrist pin cooperating to permit rotation between same and thereby between said connecting rod and said piston head, a piston skirt free of said piston head, and thrust bearing means attaching said piston skirt to said external journal surface on said wrist pin for rotational movement between same and thereby between said piston head and said piston skirt.

2. A piston assembly, as set forth in claim 1, wherein said wrist pin is formed integrally with said connecting rod and wherein said thrust bearing means is formed integrally with said piston skirt.

3. A piston assembly, as set forth in claim 1, wherein said thrust bearing means engages sides of said external journal surface on said wrist pin along a substantial portion of its length.

* * * * *